United States Patent [19]

Puyal

[11] Patent Number: 4,666,655
[45] Date of Patent: May 19, 1987

[54] PROCESS AND INSTALLATION FOR DETECTING STRAY BODIES IN A NUCLEAR REACTOR

[75] Inventor: Claude Puyal, Houilles, France

[73] Assignee: Electricite de France, France

[21] Appl. No.: 641,735

[22] Filed: Aug. 17, 1984

[30] Foreign Application Priority Data

Aug. 19, 1983 [FR] France ............... 83 13500

[51] Int. Cl.⁴ .......................................... G21C 17/00
[52] U.S. Cl. .................................................... 376/245
[58] Field of Search .................. 376/245; 73/572, 579, 73/602, 609, 610

[56] References Cited

U.S. PATENT DOCUMENTS

| | | | |
|---|---|---|---|
| 3,860,480 | 1/1975 | Carteus et al. | 376/245 |
| 3,860,481 | 1/1975 | Gopal et al. | 376/245 |
| 3,913,407 | 10/1975 | Hanff et al. | 376/245 |
| 4,304,629 | 12/1981 | Byford | 376/245 |
| 4,392,214 | 7/1983 | Marini et al. | 376/245 |

FOREIGN PATENT DOCUMENTS

| | | | |
|---|---|---|---|
| 0049659 | 4/1982 | European Pat. Off. . | |
| 2483671 | 4/1981 | France | 376/245 |
| 51-16595 | 5/1976 | Japan | 376/245 |
| 52-67492 | 6/1977 | Japan | 376/245 |
| 56-35054 | 4/1981 | Japan | 376/245 |

*Primary Examiner*—Salvatore Cangialosi
*Attorney, Agent, or Firm*—Larson and Taylor

[57] ABSTRACT

The detection of stray bodies uses the signals supplied by mechanical pulse sensors, such as accelerometers supported by separate structures of the vessel. The detection installation comprises means for detecting the coincidences between pulse signals supplied by the different sensors and having a peak factor higher than a given level, fixed by an external reference. An alarm is triggered off when the coincidence rate provided by a counter associated with a threshold circuit exceeds a given value.

9 Claims, 2 Drawing Figures

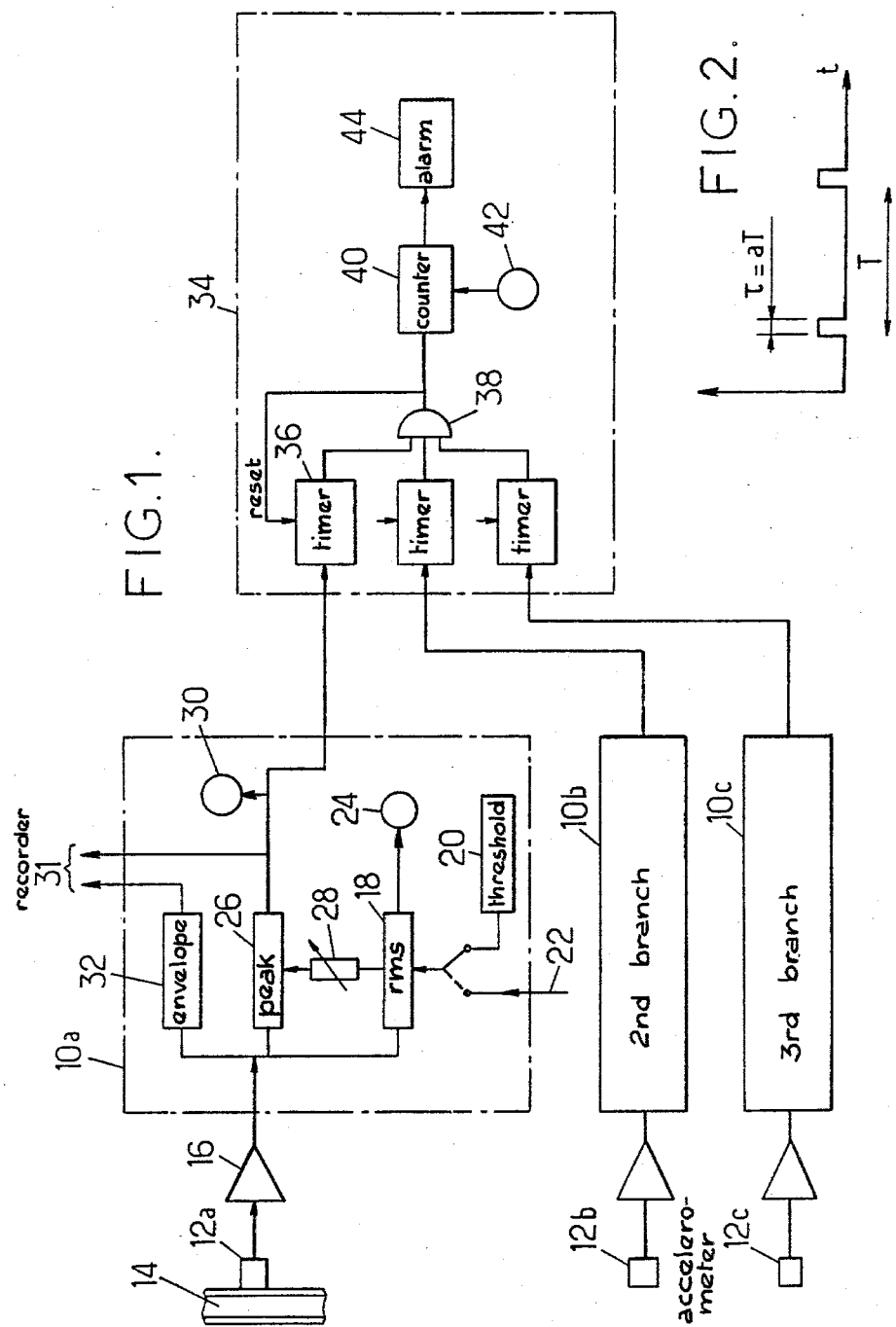

PROCESS AND INSTALLATION FOR DETECTING STRAY BODIES IN A NUCLEAR REACTOR

BACKGROUND AND SUMMARY OF THE INVENTION

Stray bodies in a nuclear reactor may, if no corrective action is taken, cause considerable damage by hammering on the structures.

A prior art method for detecting stray bodies consists in monitoring and measuring, at regular intervals (for example every day), signals supplied by sensors (generally accelerometers) placed in contact with a wall of the primary circuit of the reactor.

That approach has limitations. Except if the frequency of the monitoring operations is increased, the presence of a stray body may be detected only with a delay such that considerable damage has already occured. And it is difficult to attribute abnormal noises to a specific origin among those which are possible and which comprise vapor leaks and shocks due to non dangerous disturbing phenomena.

European Specification No. 00 49659 discloses an apparatus having several sensors each supported by a separate part of the reactor and each associated with a detection channel comprising a discriminator. All channels are connected to encoding means which classify the pulses from the different sensors in the order of arrival and compare the sequences obtained with a predetermined sequence. However, the shocks due to stray bodies cannot be identified when there is a high level of background noise.

French Specification No. 2 215 264 discloses a detection apparatus which determines the rate of the impacts detected by a sensor and their energy and which only measures the energy extremum for a given time. With this approach, discrimination as to the origin of the impacts is not possible.

An apparatus currently used by the assignee of this application detects abnormal vibrations and transients in a reactor vessel by measuring the peak factor of the vibrations applied to an accelerometer in contact with a wall of the primary circuit of the reactor. An alarm is triggered off when this factor exceeds a given value. However, the impacts cannot be differentiated as to their origin and, in particular, it is just as sensitive to the impacts due to oscillation of mechanical parts which are permanently secured as to the presence of a stray body.

It is an object of the invention to provide an improved process and installation. It is a more specific object to provide for continuous discrimination between the normal noise sources and the sources of impact noises due to stray bodies.

For that purpose, the invention uses the fact that the impacts detected by sensors, typically accelerometers, supported by parts immersed in the reactor but uncoupled from the external wall of the primary circuit, supply, in response to impacts by stray bodies against the wall of the primary circuit, correlated signals since they energize the different sensors at times which only differ by the travel time differences of the disturbance.

On the other hand, the impacts due to oscillations or vibrations of the structure carrying a detector do not give rise to correlated signals on all the detectors.

The invention uses this fact in combination with another: in the absence of impact, the vibratory background noise is random in nature and the ratio between the peak value and the effective or rms value, which is called "peak factor", does not exceed 4 to 5 because of the statistical properties of the signal. Consequently, the impact may be differentiated from the continuous background noise, even loud, because they have a peak factor higher than a threshold. Since the background noise is close to four times the effective or rms value, a peak factor threshold may be chosen equal to 12, so as to obtain good discrimination of the impacts.

According to the invention, there is provided a process for detecting stray bodies in a nuclear reactor wherein signals supplied by at least two mechanical impact sensors, such as accelerometers, are directed to individual channels. Those signal pulses which have a peak factor higher than a predetermined level are detected and the coincidence rate is determined between said signals in the two channels so as to cause an alarm when said rate exceeds a threshold.

The threshold for the coincidence rate will be chosen so as to avoid untimely alarms due to accidental coincidences. Similarly, a peak factor level (ratio between the peak value of the signal and the effective value) will be chosen so as to separate out the pulse signals due to the impacts of the background noise which is variable depending on the operation state of the reactor and which may be high in the case of vapor leaks in the primary or secondary circuit.

In general, at least in the case of a reactor using water as moderator and as cooling agent, use will be made of the coincidences between detectors supported by guide tubes passing through the wall of the vessel of the reactor. Thus the impacts due to a stray body, may be differentiated from the impacts caused by an internal instrumentation glove finger of the reactor striking against the foot of the corresponding fuel assembly. Such an impact is transmitted to the bottom of the vessel through the guide tube, but is not felt by the sensors supported by other guide tubes.

To sum up, the invention associates the determination of the peak factor, a parameter which is justified physically, from the instantaneous measurement and determination of the effective value determined from the prior measurement, and correlation between several channels. The time constant of the circuit for emasuring the effective value (rms detection circuit) will be chosen so that the presence in the signal of spaced pulses does not in practice modify this value.

The process may also advantageously comprise comparison of the effective value of the signal with a second threshold. The process thus allows even very closely spaced impacts to be detected (caused for example by the presence of several stray bodies). In this case, in fact, the effective value increases and the peak factor decreases. But the increase in the effective value causes this latter to exceed a detection threshold, which will for example be equal to three times the normal effective value, in the absence of stray bodies, and triggers off an alarm.

The invention also provides an installation for detecting stray bodies in the vessel of a nuclear reactor, for implementing the above defined process, comprising several mechanical pulse sensors, such as accelerometers, supported by separate structures of the vessel, which installation is characterized in that it comprises means for detecting coincidences between pulse signals supplied by the different sensors and having a peak factor greater than a predetermined level and means for causing an alarm in response to overshooting of a predetermined threshold by the coincidence rate.

The invention will be better understood from reading the following description of a particular embodiment, given by way of non limitative example.

SHORT DESCRIPTION OF THE DRAWINGS

FIG. 1 is a general diagram showing a simple stray body protection installation, usable in a nuclear reactor of the pressurized water type, FIG. 2 shows a possible method of generating signals having an adjustable peak factor, for calibrating an installation of the kind shown in FIG. 1.

DESCRIPTION OF A PARTICULAR EMBODIMENT

Referring to FIG. 1, the presence of stray bodies and that of normal or abnormal noises of another nature are detected. The apparatus has several identical channels or branches, three of which are shown and designated by the references 10a, 10b and 10c, and a common part. The input member of each branch is formed by an impact sensor, which will be assumed to be an accelerometer 12a, 12b or 12c. Each of the guide accelerometers is fixed to a different tube 14. In each branch 10a, 10b or 10c, the output signal of the accelerometer is applied to a booster 16 which drives, in the embodiment illustrated, two separate circuits. One of the circuits 18 is provided for working out the effective value of the signal and comparing it with a threshold supplied either by an internal source having an adjustment potentiometer 20, or by an external source 22. When the effective value of the signal exceeds the given threshold, for example following the detection of pulses with high repetition rate (this case being for example that of several stray bodies) or a high background noise (case of a vapor leak), circuit 18 actuates an alarm 24. Circuit 18 further supplies a voltage representative of the effective value to the second circuit 26, for detecting the presence of isolated pulses. This circuit 26 comprises a peak detector and means for comparing the peak value with the effective value which it receives from circuit 18 through an adjusting potentiometer 28. This potentiometer fixes then a peak factor threshold beyond which there is emission of an output pulse by circuit 26. As a general rule, a peak factor will be chosen between 10 and 15 in the case of accelerometers placed on the guide tubes. A luminous alarm signal 30 provided with a holding system for a time sufficient to allow observation may be placed at the output of each circuit 26. An additional output may be provided towards a recorder 31.

The installation shown further comprises a third envelope detection circuit 32 for also recording, in the case of an alarm, a signal representative of the envelope of the signal.

The outputs of all the branches 10a, 10b and 10c drive a common module 34 for detecting stray bodies. In the embodiment illustrated, this module is provided for determining the coincidences between signals coming from the three branches. But it would be possible to design a module 34 detecting all the coincidences between two branches out of three, or between m branches out of n (n being the total number of branches and m being an interger less than or equal to n). In the case represented, the output signal of each branch drives a timing circuit 36, formed for example by a monostable, whose output is connected to one of the inputs of an AND gate 38. The output of this gate is connected to a forced reset input of the monostables and the holding time of each monostable is chosen at a value substantially equal to the maximum difference between the propagation times of a sound wave from an impact point to all the sensors. The output of the AND gate 38 drives a coincidence rate counter 40 associated with a threshold circuit, possibly adjustable by means of a potentiometer 42. When the coincidence rate exceeds the threshold, chosen so as to be greater than the maximum rate of accidental coincidences, circuit 40 actuates an alarm 44.

The installation may in addition comprise branches connected to sensors placed on the wall of the primary circuit, for completing the monitoring (sensors at the bottom of the vessel or at the bottom of a water box of the vapor generators being insensitive to the control bar noises).

Implementation of the process of the invention may depend on the operation state of the reactor.

In a normal working phase, when the reactor is stable, at a power which may be zero but under pressure and hot, the spaced shocks (by at least 50 ms) caused by a single stray body against the vessel, energize all the accelerometers 12a, 12b, 12c. If these impacts have a peak factor in each branch exceeding the predetermined threshold, the branches emit pulse signals with a time difference less than the holding time of the monostables 36. The threshold may be chosen as a function of the particular characteristics of each reactor. However, it has been discovered that the peak factor of the background noise is generally about 4, which leads to adopting a threshold of about 12 so as to have a sensitivity corresponding to three times the peak value of the normal signal. In practice, it will be generally sufficient to provide a possibility of adjustment of the threshold between five times and twenty times the effective value.

The advantage of the presence of circuits 18 is, more especially, to give an alarm in the presence of multiple stray bodies. The impact noise then becomes substantially continuous and the effective value increases to reach a threshold for tripping 24, whereas the module 34 no longer receives any signals.

On the other hand, during a stoppage when cold, when the pressure is usually less than a 100 bars, the background noise level increases considerably (from 5 to 10 times in general). The peak factor due to the impacts decreases and the stray bodies risk not being detected. But circuits 18 are energized. So as to avoid untimely tripping of the alarms 24, the external reference 22 may be provided so as to be switched to a high value in response to a pressure drop in the primary circuit. Other solutions are obviously possible so as to avoid unjustified alarms.

The thresholds for tripping each of the branches 10a, 10b, 10c may be controlled by simulation by feeding to the input periodic signals of a known peak factor F.

When a wide threshold adjustment range is desired, extending to values of F going up to 20, it is advantageous to use periodic rectangular signals of period T and adjustable cyclic ratio $a = \tau/T$ (FIG. 2). If A is the amplitude of the signal, we have:

$$F = A/\sqrt{\overline{A^2}} \, . \, a = 1/\sqrt{a}$$

Thus very variable rates are easily obtained, as shown in the table below corresponding to a frequency of a 100 Hz:

| a | ½ | 1/100 | 1/400 |
|---|---|---|---|
| F | 1.44 | 10 | 20 |
| aT | 5 ms | 0.1 ms | 25 us |

Generators of rectangular pulses with adjustable period and pulse width in this range are available commercially or may be constructed for this purpose.

I claim:

1. A process for detecting stray bodies in a pressure vessel of a nuclear reactor comprising the steps of: providing a plurality of sensors at locations selected for said sensors to deliver respective electric signals in response to an impact of a stray body upon a wall in said vessel; determining the rms values of the signals from each of said sensors and detecting the occurence of those signals which have a peak factor higher than a predetermined level; continuously determining the rate of coincidence of said occurences from said sensors; and triggering an alarm when said rate exceeds a predetermined threshold.

2. A process according to claim 1, wherein said predetermined level is selected to separate out pulse signals due to impacts from background noise which is variable depending on the operating state of the reactor.

3. A process according to claim 1, wherein said rms value is continuously computed with such a time constant that the presence of time separated pulses does not bodily said rms value substantially.

4. A process according to claim 1, further comprising comparing said rms value of the signal from each sensor with a second predetermined threshold and triggering an alarm when said second threshold is exceeded.

5. A process according to claim 1, wherein said second threshold is selected at a value equal to three times the rms value in the absence of stray bodies.

6. A process for detecting stray bodies in a pressure vessel of a pressurized water nuclear reactor, comprising the steps of: providing a plurality of sensors each located within said pressure vessel on a respective guide tube projecting through said pressure vessel, each of said sensors delivering an electric pulse in response to an impact of a stray body upon a wall in said vessel; determining the rms value of the electric pulses from each of said sensors; delivering a signal in response to occurence of one of said pulses having a peak factor higher than a predetermined level; continuously determining the rate of coincidences of said signals; and triggering an alarm when said rate exceeds a predetermined threshold.

7. A process according to claim 6, wherein said level of the peak factor is of about 12.

8. A process according to claim 6, wherein there is a plurality n of sensors, n being an integer greater than 2, and an alarm is triggered when said rate of coincidence determined on anyone of m sensors, m being an integer at least equal to 2 lower than n, exceeds said threshold.

9. An apparatus for detecting the presence of stray bodies in a pressure vessel of a nuclear reactor, comprising: a plurality of sensors sensitive to impacts against walls and structures of said vessel, said sensors being uncoupled from the outer wall of said vessel; a measurement channel associated with each one of said sensors, each said channel being constructed and arranged to determine the ratio between the instantaneous value of the signal from the associated sensor and the rms value of said signal and for delivering a pulse when said ratio exceeds a predetermined level; and means for continuously measuring the rate of occurence of coincidences between said pulses and for triggering an alarm when said rate exceeds a predetermined threshold.

* * * * *